April 9, 1957     L. A. CARDEN     2,788,042
KEY AND CHANGE CARRIER
Filed March 10, 1955     2 Sheets-Sheet 1
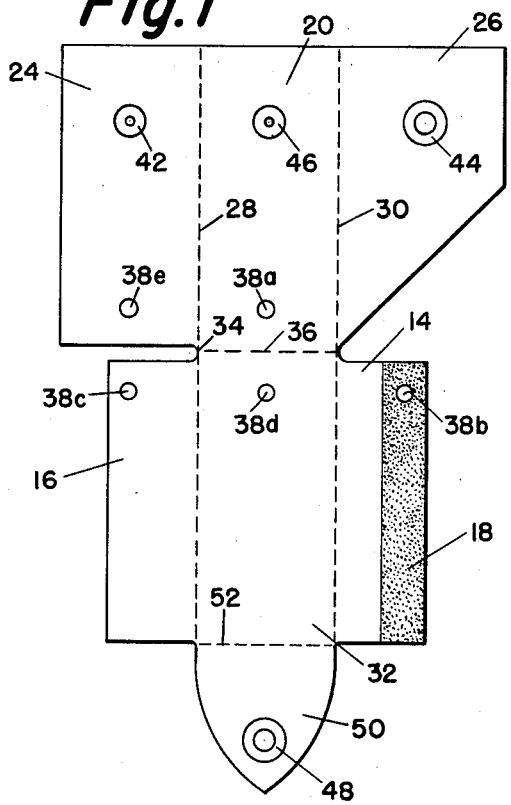
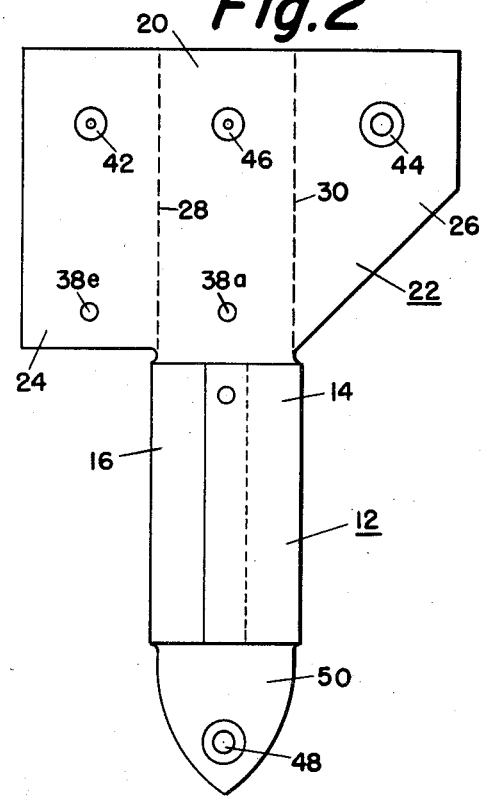
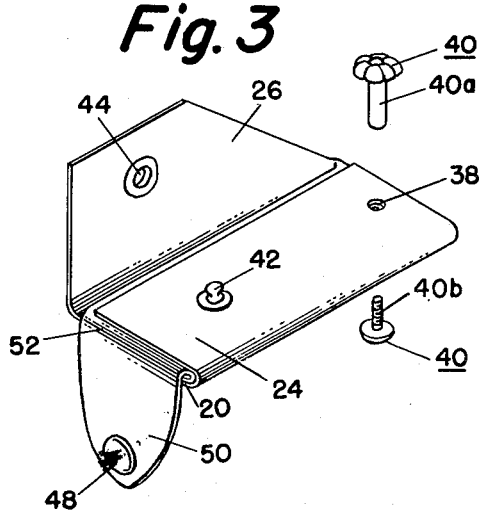
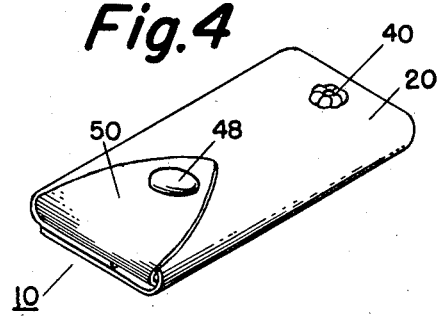
INVENTOR.
LYNN A. CARDEN
BY Arthur H. Seidel
ATTORNEY April 9, 1957   L. A. CARDEN   2,788,042
KEY AND CHANGE CARRIER
Filed March 10, 1955   2 Sheets-Sheet 2
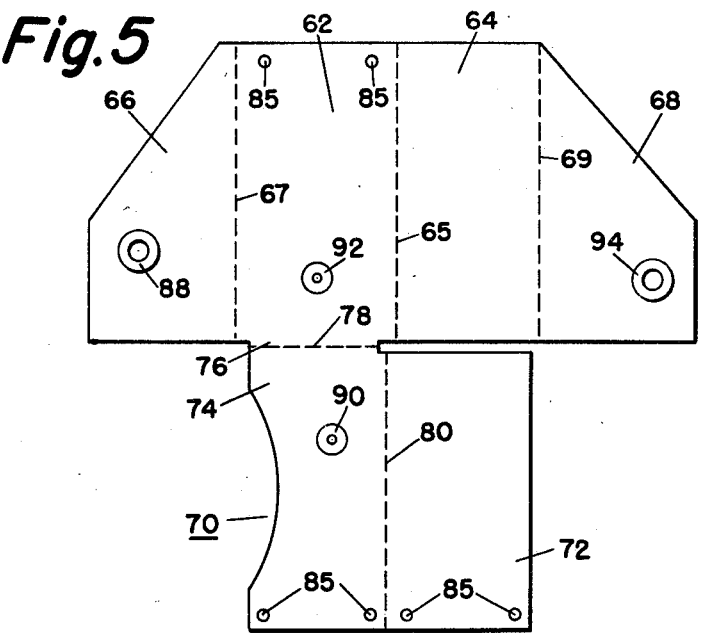
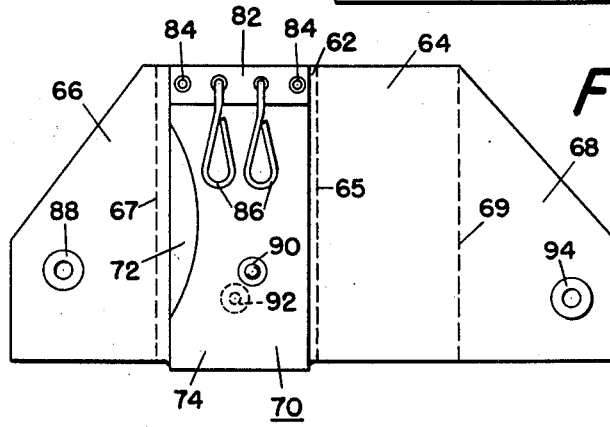
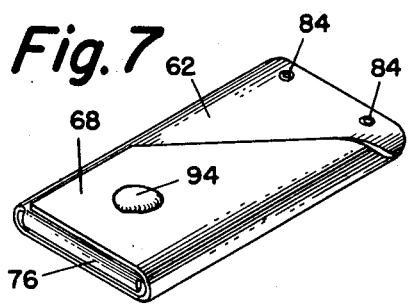
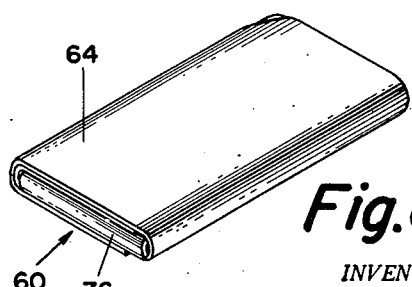
INVENTOR.
LYNN A. CARDEN
BY Arthur H. Seidel
ATTORNEY United States Patent Office 2,788,042
Patented Apr. 9, 1957

2,788,042
KEY AND CHANGE CARRIER
Lynn A. Carden, Yeadon, Pa.
Application March 10, 1955, Serial No. 493,328
4 Claims. (Cl. 150—40)

This invention relates to a combined key and change carrier, and more particularly to a device wherein both the keys and change are received within the carrier when the carrier is in closed position, and yet which permits the keys to be selectively withdrawn for use while retaining the change within the carrier.

It is an object of the present invention to provide a key and change carrier in which facile access to the change may be attained, yet in which the change is safely secured.

Another object of the present invention is the provision of a key and change carrier in which selective withdrawal of a given key may be achieved without removal of the change from the carrier.

A further object of the present invention is the provision of a key and change carrier of compact design.

For the purpose of illustrating the invention there are shown in the drawings, forms thereof which are presently preferred; it being understood, however, that this invention is not limited to the precise arrangements and instrumentalities shown.

Figure 1 is a plan view of the blank of a key and change carrier of the present invention.

Figure 2 is a plan view of the key and change carrier of Figure 1 in open position with the binding post removed, and the carrier spread flat.

Figure 3 is a perspective view of the key and change carrier of Figure 1 with the closure flaps in open position and the binder post exploded.

Figure 4 is a perspective view of the key and change carrier of Figure 1 in closed position.

Figure 5 is a plan view of the blank of another embodiment of the key and change carrier of the present invention.

Figure 6 is a plan view of the key and change carrier of Figure 5 in open position.

Figure 7 is a perspective view of the key and change carrier of Figure 5 in closed position with the closure flap uppermost.

Figure 8 is a perspective view of the key and change carrier of Figure 5 in closed position with the closure flap undermost.

Referring initially to Figures 1 through 4, the key and change carrier is designated generally by the numeral 10, and may be formed of leather or like flexible material, such as a synthetic polymer. Carrier 10 comprises a coin receptacle portion 12 consisting of overlapping receptacle flaps 14 and 16.

As seen particularly in Figures 1 and 2, receptacle portion 12 is made by joining the underside of flap 14, which is provided with an adhesive coating 18 along its peripheral marginal edge, with the upper surface of the marginal portion of flap 16.

The floor for receptacle portion 12 is achieved by pivoting receptacle portion 12 through an arc of 180 degrees from its position shown in Figure 2 to its position shown in Figure 3, so that the overlapped flaps 14 and 16 are juxtaposed to center flap 20 of body member 22.

Body member 22 comprises center flap 20 and wings 24 and 26. Wing 24 may be pivoted inwardly about fold line 28, and wing 26 may be pivoted inwardly about fold line 30.

Body member 22 is integral with the middle or face flap 32; center flap 20 and face flap 32 being joined together across bridge 34, which is provided with a fold line 36. As heretofore explained, coin receptacle portion 12 may be pivoted about fold line 36 so that overlapped flaps 14 and 16 are juxtaposed to center flap 20 of body member 22 (see Figure 3).

A passage or channel 38 is formed when coin receptacle portion 12 is in its pivoted position by the mating of aperture 38a in center flap 20, aperture 38b in receptacle flap 14, aperture 38c in receptacle flap 16, aperture 38d in face flap 32, and aperture 38e in wing 24. Apertures 38a, 38b, 38c, 38d and 38e mate to form channel 38 when coin receptacle portion 12 is pivoted to its position shown in Figure 3. A binder post 40 comprising a threaded female element 40a and a mating threaded male element 40b is received within channel 38.

The user's keys are carried in key and change carrier 10 by thrusting binder post 40 through the eye of each key. The keys are retained in their withdrawn position intermediate face flap 32 and the inner face of wing 24.

The outer face of wing 24 is provided with a stud or male snap fastener element 42, and the inner face of wing 26 is provided with a mating socket 44 for receiving stud 42.

Wing 26 may be lockingly superposed over wing 24 when stud 42 is received within socket 44.

The outer face of center flap 20 is provided with a stud or male snap fastener element 46 which may be mated with a mating socket or female snap fastener element 48 on triangular extension flap or cover flap 50, which is integral with face flap 32. Cover flap 50 may be pivoted about fold line 52 to open and close coin receptacle portion 12.

In the embodiment of my invention shown in Figures 1 through 4 access to change within coin receptacle portion 12 may be had without disturbing the keys carried on binder post 40.

In the embodiment of my invention shown in Figures 5 through 8, the key and change carrier is designated 60 and may be formed of leather or like flexible material, such as a synthetic polymer. Carrier 60 comprises center flaps 62 and 64 separated by fold line 65 and wing flaps 66 and 68. Wing flap 66 is separated from center flap 62 by fold line 67, and wing flap 68 is separated from center flap 64 by fold line 69.

Coin receptacle portion 70 is juxtaposed against center flap 62, and has a width somewhat less than the width of center flap 62 so that it is intermediate fold lines 65 and 67.

Coin receptacle portion 70 comprises a folded-under flap 72, which is flush against center flap 62; and an outer flap 74, which is integral with center flap 62, and is secured thereto across bridge 76. Bridge 76 is creased at crease line 78, and fold-under flap 72 and outer flap 74 are separated by crease line 80.

Plate 82 is secured flush against the outer face of outer flap 74 by attaching means such as rivets or eyelets 84 which pass through apertures 85 in flaps 62, 72 and 74. Rivets 84 press flaps 62, 72 and 74 tightly together and seal the upper end of coin receptacle portion 70.

Snap hooks 86 adapted to hang keys through their eyes are suspended from plate 84.

Wing flap 66 is provided with a socket or female snap fastener member 88 which mates with a stud or male snap fastener member 90 on outer flap 74. When wing flap 66 is locked in position by the interengagement of socket 88 and stud 90, coin receptacle 70 is closed.

The user's keys are carried on snap hooks 86 intermediate the inner face of center flap 64 and the juxtaposed portions of flaps 74 and 66.

Center flap 62 is provided on its rear surface with a stud or male snap fastener element 92. Stud 92 mates with a socket or female snap fastener element 94 which is provided on flap 68, when flaps 64 and 68 are folded along respective fold lines 65 and 69.

Access to the keys and selective withdrawal of the desired key can be attained in the embodiment shown in Figures 5 through 8, without tampering with the coin receptacle portion 70, mere disengagement of socket 94 from stud 92 is all that is necessary.

The present invention may be embodied in other specific forms without departing from the spirit or essential attributes thereof and, accordingly, reference should be made to the appended claims, rather than to the foregoing specification as indicating the scope of the invention.

I claim:

1. A key and change carrier including a sheath portion formed of at least three integral panels, said panels separated by fold lines, and a coin receptacle portion, said coin receptacle portion comprising a plurality of panels overlappingly joined, said coin receptacle portion having an opening along one edge thereof, one of the panels of said coin receptacle portion being integral with and an extension of an inner panel of said sheath portion, said coin receptacle portion being juxtaposed to said inner panel and having a width less than the width of said inner panel, adjacent panels to said inner panel of the sheath portion overlapping said coin receptacle portion when said carrier is closed, a closure member on the sheath portion and a mating closure member on the coin receptacle portion, one of said closure members being carried on a flap which covers the opening of said coin receptacle portion when said closure member is engaged with its mating closure member, and a key holder extending from said coin receptacle portion.

2. A key and change carrier including a sheath portion formed of at least three integral panels, said panels separated by parallel fold lines, and a coin receptacle portion, said coin receptacle portion comprising a plurality of panels overlappingly joined, said coin receptacle portion having an opening along one edge thereof, one of the panels of said coin receptacle portion being integral with and an extension of an inner panel of said sheath portion, said coin receptacle portion being juxtaposed to said inner panel and having a width less than the width of said inner panel, adjacent panels to said inner panel of the sheath portion overlapping said coin receptacle portion when said carrier is closed, a closure member on the sheath portion and a mating closure member on the coin receptacle portion, one of said closure members being carried on a flap which covers the opening of said coin receptacle portion when said closure member is engaged with its mating closure member, a key holder extending from said coin receptacle portion, mating closure members on said sheath portion, whereby when said last-mentioned mating closure members are engaged with each other, said sheath may be locked in closed position with the coin receptacle portion received therewithin.

3. A key and change carrier including a sheath portion formed of at least three integral panels, said panels separated by fold lines, and a coin receptacle portion, said coin receptacle portion comprising a plurality of panels overlappingly joined, said coin receptacle portion having an opening along one edge thereof, one of the panels of said coin receptacle portion being integral with and an extension of an inner panel of said sheath portion, said coin receptacle portion being juxtaposed to said inner panel and having a width less than the width of said inner panel, adjacent panels to said inner panel of the sheath portion overlapping said coin receptacle portion when said carrier is closed, one of the panels of said sheath portion covering the opening in said container portion when said panel overlaps the coin container portion, a closure member on said sheath panel and a mating closure member on said coin container portion, whereby when said closure members are engaged with each other the last-mentioned sheath panel covers said opening in said coin container portion, and a key holder extending from said coin receptacle portion.

4. In a receptacle, a sheath portion formed of four integral parallel panels of substantially uniform width at their region of maximum width, said panels separated by fold lines, an inner one of said panels having an extension integral therewith, a fold line between said extension and said inner panel, said extension comprising a pair of panels folded back along said last-mentioned fold line and along a fold line generally perpendicular thereto and juxtaposed to said inner panel, the width of said folded back extension being somewhat less than the width of said inner panel, the juxtaposed end portions of the panels of said folded back extension and said inner panel remote from the fold line between the extension and inner panel being joined by a member passing through said three panels, closure means extending from the outside face of the panel of the folded back extension which comprises a projection of said juxtaposed inner panel, and mating closure means on the inside face of the outer panel of said sheath adjacent said juxtaposed inner panel, closure means extending from the rear of said juxtaposed inner panel, and mating closure means for said last-mentioned closure means on the inside face of the outer panel of said sheath remote from said juxtaposed inner panel.

References Cited in the file of this patent

UNITED STATES PATENTS

| | | |
|---|---|---|
| 1,715,752 | Griffin et al. | June 4, 1929 |
| 1,920,060 | Buxton | July 25, 1933 |
| 2,270,015 | Wright | Jan. 13, 1942 |
| 2,354,793 | Broughton | Aug. 1, 1944 |
| 2,359,154 | Reichle | Sept. 26, 1944 |